United States Patent
Shum et al.

(10) Patent No.: US 9,963,195 B1
(45) Date of Patent: May 8, 2018

(54) MOTORIZED BICYCLE WITH ELECTRONIC SPEED CONTROLLED GEARS

(71) Applicant: Evantage Ltd, Hong Kong (CN)

(72) Inventors: Henry Shum, Hong Kong (CN); Adam Rand, Marblehead, MA (US)

(73) Assignee: Sunluxe Enterprises Limited, Hong Kong (CN)

( * ) Notice: Subject to any disclaimer, the term of this patent is extended or adjusted under 35 U.S.C. 154(b) by 0 days. days.

(21) Appl. No.: 14/835,719

(22) Filed: Aug. 26, 2015

Related U.S. Application Data

(60) Provisional application No. 62/043,377, filed on Aug. 28, 2014.

(51) Int. Cl.

| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B62M 6/50* | (2010.01) |
| *B62M 6/90* | (2010.01) |
| *B60W 20/10* | (2016.01) |
| *F16H 9/00* | (2006.01) |
| *F16H 59/00* | (2006.01) |
| *F16H 61/00* | (2006.01) |
| *F16H 63/00* | (2006.01) |
| *B60K 1/02* | (2006.01) |

(52) U.S. Cl.
CPC .............. *B62M 6/50* (2013.01); *B60W 20/10* (2013.01); *B62M 6/90* (2013.01)

(58) Field of Classification Search
CPC .............................. B62M 6/50; B60W 20/10
USPC ................ 701/22; 180/206.3; 474/80; 477/3
See application file for complete search history.

(56) References Cited

U.S. PATENT DOCUMENTS

| | | | |
|---|---|---|---|
| 8,602,149 B2 | 12/2013 | Krieger et al. | |
| 2012/0083958 A1* | 4/2012 | Ballard ................. | B60W 10/06 701/22 |
| 2013/0001000 A1* | 1/2013 | Krieger .................... | B62M 6/45 180/206.3 |
| 2013/0110335 A1* | 5/2013 | Durdevic ................. | B62M 6/45 701/22 |
| 2013/0267376 A1* | 10/2013 | Takachi ................ | B60W 20/10 477/3 |
| 2014/0235383 A1* | 8/2014 | Wesling .................... | F16H 9/06 474/80 |

* cited by examiner

*Primary Examiner* — Mahmoud S Ismail
(74) *Attorney, Agent, or Firm* — North Shore Patents, P.C.; Michele Liu Baillie

(57) ABSTRACT

A motorized bicycle includes a frame, a plurality of wheels coupled to the frame, pedals coupled to the frame for driving at least one of the wheels, gear(s) coupled to the frame, a motor coupled to the pedals and at least one of the wheels; a battery for supplying power to the motor; and a controller. In response to a selection of a current gear, the controller regulates a power output from the battery to the motor based on the current gear, where the motor propels the motorized bicycle to travel within a predetermined speed range associated with the current gear.

6 Claims, 5 Drawing Sheets

MOTORIZED BICYCLE WITH ELECTRONIC SPEED CONTROLLED GEARS

BACKGROUND OF THE INVENTION

Bicycles exist with motors that propel the bicycle forward. However, many of these motorized bicycles contain batteries and motors that output the same power regardless of the gear of the bicycle.

SUMMARY OF THE INVENTION

According to one embodiment of the present invention, a motorized bicycle includes: a frame; a plurality of wheels coupled to the frame; a plurality of pedals coupled to the frame for driving at least one of the plurality of wheels; a plurality of gears coupled to the frame; a motor coupled to the pedals and at least one of the plurality of wheels; a battery for supplying power to the motor; and a controller. In response to a selection of a current gear of the plurality of gears, the controller regulates a power output from the battery to the motor based on the current gear, where the motor propels the motorized bicycle to travel within a predetermined speed range associated with the current gear.

In one aspect of the present invention, the motorized bicycle further includes a shifter coupled to the controller for receiving the selection of the current gear.

In one aspect of the present invention, the motorized bicycle further includes one or more gear sensors for detecting the current gear of the motorized bicycle.

In one aspect of the present invention, the motorized bicycle further includes a cable and a derailleur coupled to the plurality of gears, where the one or more gear sensors are coupled to the cable for detecting a position of the cable, where the controller determines a position of the derailleur using the position of the cable.

In one aspect of the present invention, the motorized bicycle further includes an electrical interface coupled to the plurality of gears, where the one or more gear sensors are coupled to the electrical interface for reading the current gear from the electrical interface.

In one aspect of the present invention, the motorized bicycle further includes an interface between the controller and one or more biometric sensors, where the controller further adjusts the power output from the battery or adds resistance according to one or more measurements from the one or more biometric sensors.

According to another embodiment of the present invention, a method for controlling a speed of a motorized bicycle, includes: (a) receiving, by a shifter coupled to a controller of the motorized bicycle, a gear selection from a rider of the motorized bicycle; (b) determining, by the controller, a current gear of the motorized bicycle; and (c) causing, by the controller, a given power output from the battery to a motor coupled to the motorized bicycle, based on the current gear, wherein the motor propels the motorized bicycle to travel within a predetermined speed range associated with the current gear.

According to another embodiment of the present invention, a computer readable medium includes computer readable program code embodied therein. When the program code is executed by a processor, it causes the processor to: (a) receive a gear selection from a rider of the motorized bicycle; (b) determine a current gear of the motorized bicycle; and (c) cause a given power output from the battery to a motor coupled to the motorized bicycle, based on the current gear, wherein the motor propels the motorized bicycle to travel within a predetermined speed range associated with the current gear.

DETAILED DESCRIPTION OF THE INVENTION

Figure 1A:
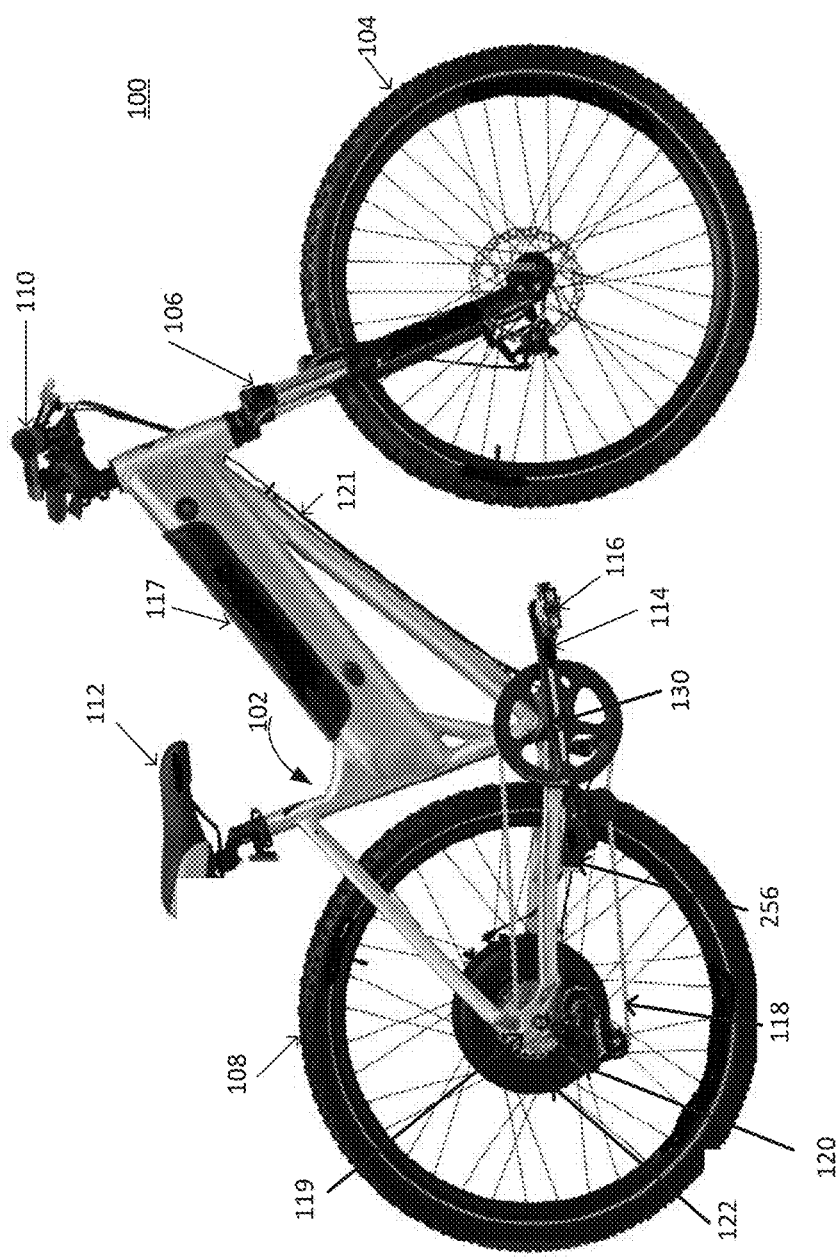
FIGS. 1A and 1B illustrate a motorized bicycle according to embodiments of the present invention.

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention can take the form of an entirely hardware embodiment, an entirely software embodiment or an embodiment containing both hardware and software elements. Furthermore, the present invention can take the form of a computer program product accessible from a computer usable or computer readable storage medium providing program code for use by or in connection with a computer or any instruction execution system. For the purposes of this description, a computer usable or computer readable storage medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Input/output or I/O devices (including but not limited to keyboards, displays, point devices, etc.) can be coupled to the system either directly or through intervening I/O controllers.

The flowchart and block diagrams in the Figures illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1B:
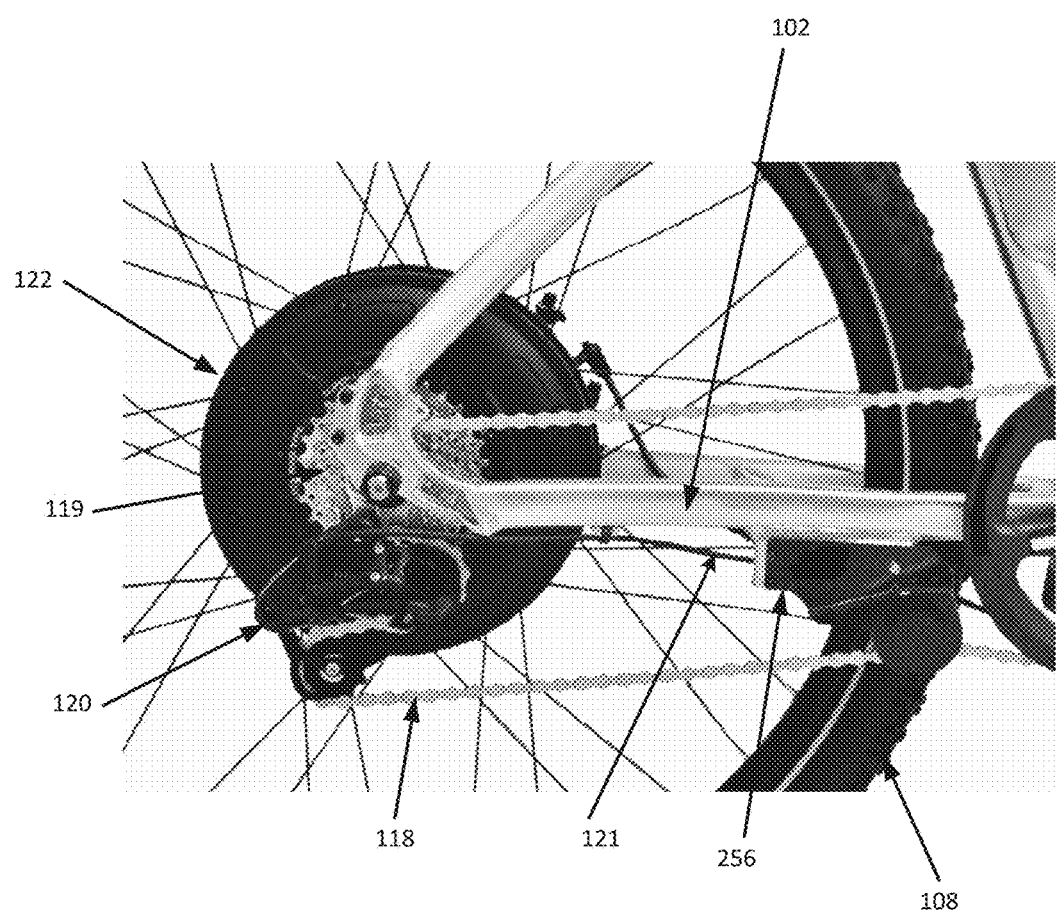

FIGS. 1A and 1B illustrate a motorized bicycle according to embodiments of the present invention. In the embodiment illustrated in FIG. 1, the bicycle 100 can generally include a frame 102, a front wheel 104 supported by the frame 102, for example, using a front fork 106, and a rear wheel 108 supported by the frame 102. Optionally, the bicycle 100 may include a third wheel (not shown) coupled to the frame 102. The bicycle 100 can further include handlebars 110 coupled to the front wheel 104, for example, through the front fork 106, to provide steering of the front wheel 104. Additionally, the bicycle 100 can include a seat 112 to support the rider. The bicycle 100 can also include a crank 114 with pedals 116, which can be turned by the rider to turn the rear wheel 108, for example, through a belt or chain 118, or other power transmission device. The position of the belt/chain 118 on the rings coupled to the crank 114 and the rings 119 coupled to the rear wheel 108 provide multiple gears. A user selects a gear for the bicycle 100 via a shifter, typically coupled to the handlebars 110. A cable 121 is coupled to the shifter and the derailleur 120. The shifter controls the cable 121, which in turn controls a position of the derailleur 120. The derailleur 120 moves the belt/chain 118 to the ring 119 coupled to the rear wheel 108 and/or rings coupled to the crank 114 that corresponds to the selected gear. The bicycle 100 further includes a control system which includes a power source, such as a battery 117, and a controller (hidden) that delivers electric power from the battery 117 to an electric motor 122. Here, the battery 117 is mid-mounted to the frame 102, for example, in the top tube, but may be located elsewhere on the bicycle 100. The electric motor 122 may be coupled to the hub of the rear wheel 108, the hub of the front wheel 104, or to a center mount 130. The motor 122 drives one or more of the wheels 104, 108. As illustrated in FIG. 1A, the motor 122 drives the rear wheel 108.

FIG. 1B illustrates in more detail the gears of the bicycle 100 at the rear wheel according to embodiments of the present invention. The gears at the rear wheel include the belt/chain 118, the rings 119, the derailleur 120, and the cable 121. As the rider changes the gear of the bicycle 100 via a shifter (not shown), the cable 121 coupled to the shifter and the derailleur 120 causes the derailleur 120 to move, which in turn moves the belt/chain 118 to the ring 119 corresponding to the selected gear. A sensor unit 256, with one or more sensors, is coupled to the frame 102 with portions of the cable 121 and the chain 118 residing in the sensor unit 256. One or more sensors in the sensor unit 256 detects a pedaling cadence and/or the gear of the bicycle 100. FIG. 1B illustrates gears provided by an external cassette, however, other types of gears may also be used without departing from the spirit and scope of the present invention, including but not limited to freewheels and internal geared hubs with mechanical or electrical shifting mechanisms.

Figure 2:
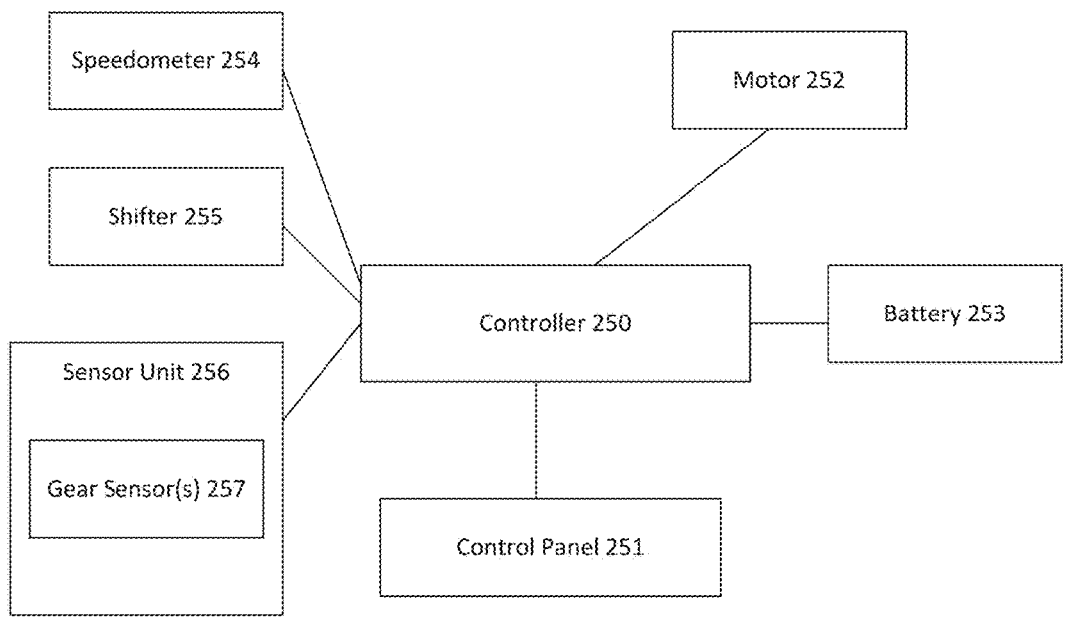
FIG. 2 illustrates in more detail the control system of the motorized bicycle according to embodiments of the present invention.

FIG. 2 illustrates in more detail the control system of the motorized bicycle according to embodiments of the present invention. The control system includes the controller 250 coupled to a control panel 251, the motor 252, and the battery 253. The controller 250 further interfaces with a speedometer 254 for measuring the speed of the bicycle 100, such as by measuring a wheel speed of the rear wheel 108, a shifter 255 for controlling the gearing of the bicycle 100, and a sensor unit 256 with one or more gear sensors 257 for detecting the current gear of the bicycle 100. In the embodiment illustrated in FIGS. 1A and 1B, the gear sensors 257 are coupled to the cable 121 and detect the position of the cable 121, which is then used by the controller 250 to determine the position of the derailleur 120, which in turn indicates the current gear. For an electrical shifting mechanism, the gear sensors 257 may be coupled to the electrical interface with the cable 121, and the gear sensors 257 reads the current gear from the electrical interface. In this embodiment, the bicycle 100 has a regeneration mode and an assistance mode. In the regeneration mode, when the rider pedals, electric power is generated which is used to charge the battery 253. In the regeneration mode, the motor 252 applies a predetermined amount of resistance to the bicycle 100, such that more effort is required to propel the bicycle 100. In the assistance mode, any regeneration of the battery 253 is stopped, and power is output from the motor 252 to assist the rider in propelling the bicycle 100 forward.

A user interacts with the control system through the control panel 251, which may be mounted on the handlebars 110 or some other appropriate location. In this embodiment, one or more of the gears available to the rider is associated with a predetermined speed range, stored at the controller 250. When a user selects a gear using the shifter 255, the controller 250 detects the current gear via the gear sensors 257, which activates circuits in the controller 250 to cause the motor 252 to propel the bicycle to travel with the speed range associated with the current gear. To do so, the controller 250 regulates the power provided to the motor 252 from the battery 253.

Figure 3:
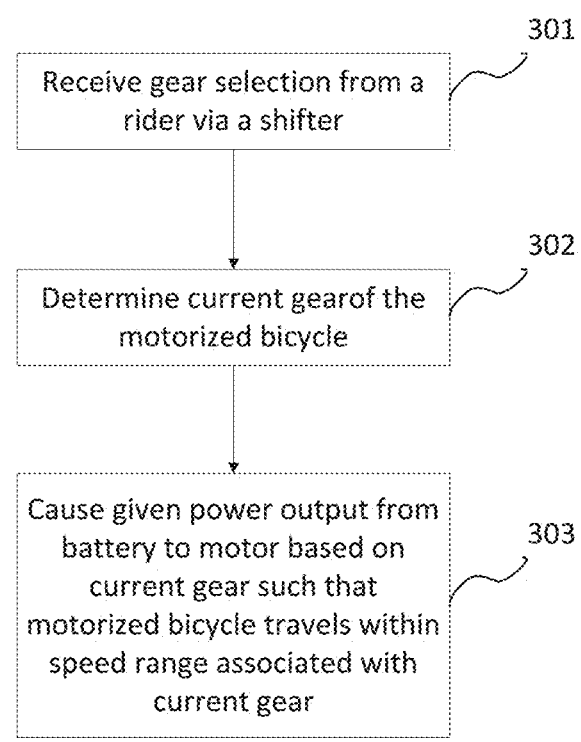
FIG. 3 is a flowchart illustrating a method of controlling a speed of a motorized bicycle according to embodiments of the present invention.

FIG. 3 is a flowchart illustrating a method of controlling a speed of a motorized bicycle according to embodiments of the present invention. First, a gear selection is received from a user via the shifter 255 (301). The controller 250 determines the current gear via the gear sensor(s) 257 (302). The controller 250 then causes a given power output from the battery 253 to the motor 252 based on the current gear, such that the motorized bicycle travels within the speed range associated with the current gear (303). For example, the highest available gear may be associated with a speed range of 0-100% of a maximum speed, while a lowest available gear may be associated with a speed range of 0-3% of the maximum speed. Gears between the highest and lowest available may be associated with a speed range between these speed ranges.

Optionally, the controller 250 interfaces with one or more biometric sensors and considers measurements from the biometric sensors in adjusting the power output from the battery 253. Biometric sensors may be worn or otherwise attached to the rider at any location corresponding to the desired biometric reading. The controller 250 may interface with the biometric sensors through wireless or wired interfaces, including but not limited to Bluetooth™, Universal Serial Bus (USB), and Apple Lightning™. The controller 250 may communicate with the biometric sensors directly, via an application running on a mobile device, or in other direct or indirect ways. For example, a heartrate monitor may be worn on a rider's chest, wrist, arm, or clothing. If the rider's heartrate is measured to be below a target heartrate, the controller 250 may be configured to further adjust the power output from the battery 253 to a lower level, or place the bicycle 100 in regeneration mode, adding resistance to the bicycle 100. If the rider's heartrate is measured to be above a target heartrate, the controller 250 may be configured to further adjust the power output from the battery 253 to a higher level.

Figure 4:
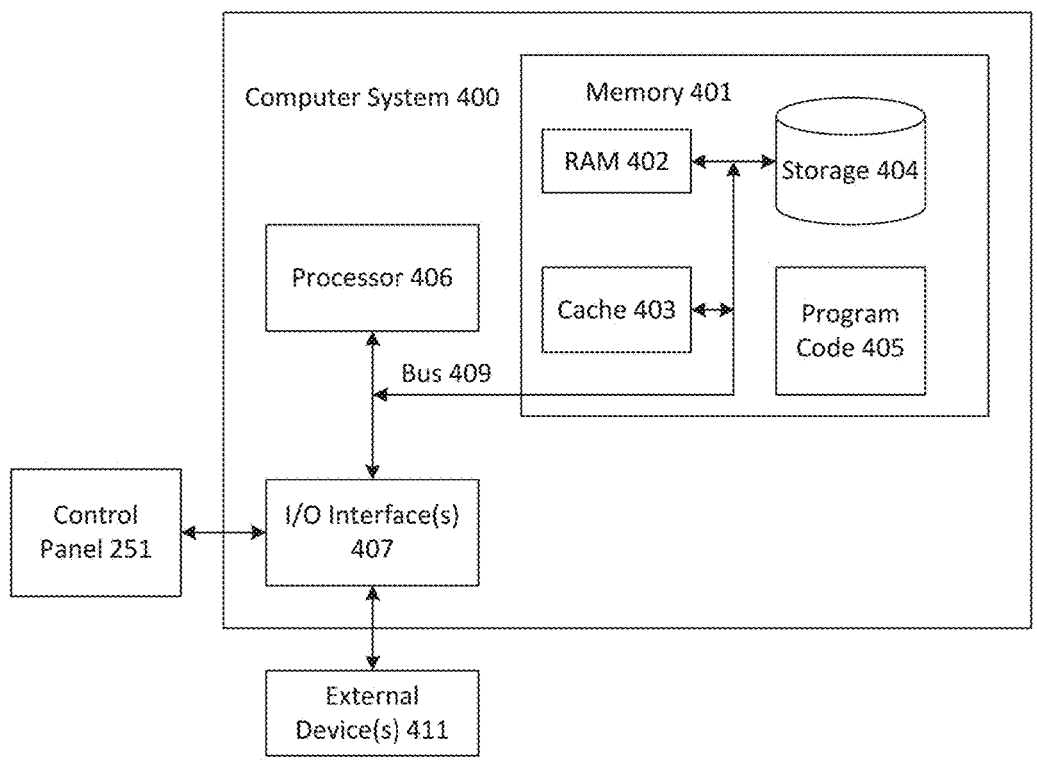
FIG. 4 illustrates a computing system according to embodiments of the present invention.

In one embodiment, the controller 250 comprises a computing system as illustrated in FIG. 4. The computing system 400 is operationally coupled to a processor or processing units 406, a memory 401, and a bus 409 that couples various system components, including the memory 401 to the processor 406. The bus 409 represents one or more of any of several types of bus structure, including a memory bus or memory controller, a peripheral bus, an accelerated graphics port, and a processor or local bus using any of a variety of bus architectures. The memory 401 may include computer readable media in the form of volatile memory, such as random access memory (RAM) 402 or cache memory 403, or non-volatile storage media 404. The memory 401 may include at least one program product having a set of at least one program code module 405 that are configured to carry out the functions of embodiment of the present invention when executed by the processor 406. The computing system 400 may also communicate with one or more external devices 411, such as the control panel 251, via I/O interfaces 407.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A motorized bicycle, comprising:
    a frame;
    a plurality of wheels coupled to the frame;
    a plurality of pedals coupled to the frame for driving at least one of the plurality of wheels;
    a plurality of gears coupled to the frame, each gear being associated with a different speed range;
    a motor coupled to the pedals and at least one of the plurality of wheels to drive the least one wheel;
    a battery for supplying power to the motor;
    a shifter;
    a cable coupled to the shifter and to the plurality of gears;
    a derailleur coupled to the plurality of gears;
    one or more gear sensors coupled to the cable to detect a position of the cable; and
    a controller that determines a position of the derailleur using the position of the cable, the controller further detects a current gear higher than a previous gear of the plurality of gears of the motorized bicycle using the position of the derailleur, the controller further regulates a power output from the battery to the motor based on the current gear to cause the motor to drive the at least one wheel to propel the motorized bicycle to travel within a speed range associated with the current gear,
    wherein the controller interfaces with one or more biometric sensors and considers measurements from the biometric sensors in adjusting the power output from the battery based on measurements from the biometric sensors.

2. The motorized bicycle of claim 1, further comprising an electrical interface coupled to the plurality of gears, wherein the one or more gear sensors are coupled to the electrical interface for reading the current gear from the electrical interface.

3. A method for controlling a speed of a motorized bicycle, comprising:
    (a) detecting a position of a cable of the motorized bicycle, by one or more gear sensors coupled to the cable, wherein the cable is coupled to a shifter and to a plurality of gears of the motorized bicycle, wherein each gear is associated with a different speed range;
    (b) determining a position of a derailleur coupled to the plurality of gears using the position of the cable;
    (c) detecting, by a controller, a current gear higher than a previous gear of the plurality of gears of the motorized bicycle using the position of the derailleur; and
    (d) regulating, by the controller, a power output from the battery to a motor coupled to at least one wheel of a plurality of wheels of the motorized bicycle based on the current gear to cause the motor to drive the at least one wheel to propel the motorized bicycle to travel within a speed range associated with the current gear, wherein the controller interfaces with one or more biometric sensors and considers measurements from the biometric sensors in adjusting the power output from the battery based on measurements from the biometric sensors.

4. The method of claim 3, wherein the motorized bicycle further comprises an electrical interface coupled to the plurality of gears, and one or more gear sensors coupled to the electrical interface, wherein the detecting (c) comprises:
    (c1) reading the current gear from the electrical interface using the one or more gear sensors.

5. A computer readable medium comprising computer readable program code embodied therein, wherein when executed by a processor causes the processor to:
    (a) determine a position of a derailleur coupled to the plurality of gears using a position of a cable;
    (b) detect a current gear higher than a previous gear of the plurality of gears of the motorized bicycle using the position of the derailleur, wherein the cable is coupled to a shifter of the motorized bicycle and to the plurality of gears, wherein each gear is associated with a different speed range; and
    (c) regulate a power output from the battery to a motor coupled to at least one wheel of a plurality of wheels of the motorized bicycle based on the current gear to cause the motor to drive the at least one wheel to propel the motorized bicycle to travel within a speed range associated with the current gear, wherein the controller interfaces with one or more biometric sensors and considers measurements from the biometric sensors in adjusting the power output from the battery based on measurements from the biometric sensors.

6. The medium of claim 5, wherein the motorized bicycle further comprises an electrical interface coupled to the plurality of gears, and one or more gear sensors coupled to the electrical interface, wherein the detect (b) comprises:
- (b1) read the current gear from the electrical interface using the one or more gear sensors.

\* \* \* \* \*